(12) United States Patent
Hull

(10) Patent No.: US 10,393,504 B2
(45) Date of Patent: Aug. 27, 2019

(54) OPTICAL COORDINATE MEASUREMENT SYSTEM

(71) Applicant: The Boeing Company, Chicago, IL (US)

(72) Inventor: Jerald A. Hull, Charleston, SC (US)

(73) Assignee: The Boeing Company, Chicago, IL (US)

( * ) Notice: Subject to any disclaimer, the term of this patent is extended or adjusted under 35 U.S.C. 154(b) by 275 days.

(21) Appl. No.: 15/637,452

(22) Filed: Jun. 29, 2017

(65) Prior Publication Data

US 2019/0003823 A1  Jan. 3, 2019

(51) Int. Cl.
*G01B 11/24* (2006.01)
*G01B 11/25* (2006.01)
*G01B 11/00* (2006.01)
*G01B 5/008* (2006.01)

(52) U.S. Cl.
CPC ............ *G01B 11/005* (2013.01); *G01B 5/008* (2013.01); *G01B 11/24* (2013.01); *G01B 11/254* (2013.01); *G01B 11/2518* (2013.01)

(58) Field of Classification Search
CPC ... G01B 11/005; G01B 11/24; G01B 11/2518; G01B 11/254; G01B 5/008
See application file for complete search history.

(56) References Cited

U.S. PATENT DOCUMENTS

| 5,506,682 A | * | 4/1996 | Pryor | A01B 69/008 356/400 |
| 6,246,468 B1 | * | 6/2001 | Dimsdale | G01B 11/002 356/4.02 |
| 2012/0257017 A1 | * | 10/2012 | Pettersson | G01B 11/005 348/46 |

* cited by examiner

*Primary Examiner* — Siamak Harandi
(74) *Attorney, Agent, or Firm* — Miller, Matthias & Hull LLP

(57) ABSTRACT

An optical coordinate measuring system (OCMS) for manufactured components having build variations that require splices for accurate integration of the components. The OCMS includes manufacturing the components that include integral three dimensional optical reticle image arrays affixed to predetermined surfaces of the components, such that those surfaces can be optically captured in three dimensional composite measurements associated with various 3-D scanned poses. Each pose includes an orthogonal pair of grid lines, and each pose involves a single field of view. A plurality of poses can then be collated to form composite measurements that extend out-of-range of any single pose. The three dimensional optical reticle image arrays can be concave or convex, ideally formed as an integral part of each as-manufactured component. The three dimensional aspect enhances scanning clarity of each scanned pose, thus assuring greater accuracies of composite measurements that result from any plurality of collated poses.

20 Claims, 5 Drawing Sheets

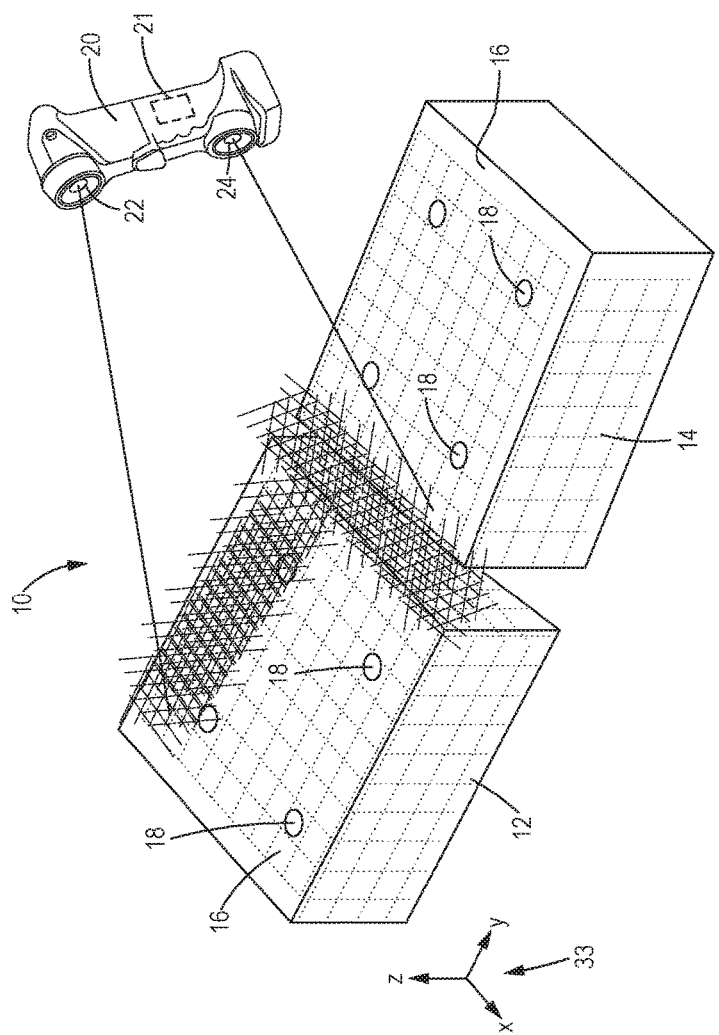
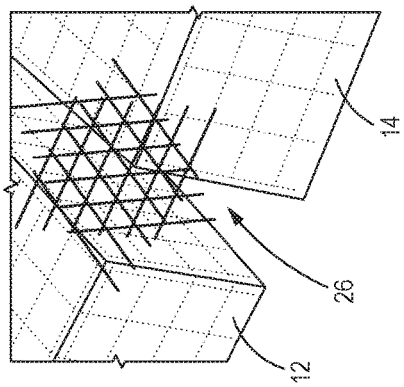
FIG. 1
FIG. 2

OPTICAL COORDINATE MEASUREMENT SYSTEM

FIELD

The present disclosure relates generally to providing real-time pre-assembly three-dimensional measurements of parts involving close tolerances, and more specifically to a system of using optical coordinates for measuring such components, as for example aircraft wing structures, with precision locational accuracy in advance of final assembly.

BACKGROUND

Commercial aircraft components have traditionally incorporated interior arrays of interconnected metal parts, including spars, ribs and stringers, for meeting varying tensile, compression, bending, and torsional load demands incurred in aircraft flight and landing operations. As newer, lighter, and stronger, composite materials have become available for enhancing structural support, additional possibilities exist for building stronger components for improving performance without weight penalties of traditional metal structures.

One aspect of this initiative involves critical measurements of component parts to be assembled to avoid issues related to tolerance stack-up. Such measurements can help minimize on-board drilling and associated clean-up operations for enhanced manufacturing efficiencies. Although significant gains have been achieved in uses of coordinate measurement machines, including three-dimensional scanning, robotic arms, and other associated technologies, there remain potential opportunities for realizing even greater tolerance accuracies and to thus enhance structural integration of component parts.

SUMMARY

In accordance with one form of the present disclosure, an optical coordinate measuring system (OCMS) for components having build variations that require splices for accurate system integration of the components is provided. The OCMS involves processes for manufacturing the components that incorporate integral three dimensional optical reticle image arrays on predetermined surfaces of the components. This enables those surfaces of the components to be captured within a three dimensional composite measurement associated with a plurality of 3-D scanned poses. Each individual pose comprises an orthogonal pair of grid lines and covers a single field of view, and the plurality of poses are then collated to form composite measurements that extend out-of-range of any single pose.

In accordance with another form of the present disclosure, a process for joining a pair of aircraft components together includes a splice for joining the aircraft components, and applies an optical coordinate measuring system (OCMS) adapted for aircraft components having build variations that require splices for accurate system integration of the aircraft components. The OCMS includes manufacturing the aircraft components to include integral three dimensional optical reticle image arrays on predetermined surfaces of the aircraft components, such that those surfaces of the aircraft components can be captured within a three dimensional composite measurement associated with a plurality of poses. Each individual pose includes an orthogonal pair of grid lines, and covers a single field of view, and the plurality of poses is collated to form composite measurements that extend out-of-range of any single pose.

In accordance with yet another form of the present disclosure, a process of splicing together a pair of components includes forming a pair of components to be joined together by first machining features into a pair of part stock; adding a reticle grid to each of the machined components; positioning and indexing the paired components on a pre-assembly jig in advance of their permanent connection to each other; acquiring an inertial 3-D scanner and performing three-dimensional scanned poses of various machined part features of the paired components; refining acquired pose data by applying post scan pose optimization via predetermined algorithm; collating poses to integrate feature measurements into an optimized composite measurement; identifying specific geometric target features from the optimized composite measurement; exporting measurements for target features; machining a blank splice part to fit the optimized composite measurement; and installing the machined splice onto the joined components to permanently connect the components together.

The features, functions, and advantages disclosed herein can be achieved independently in various embodiments or may be combined in yet other embodiments, the details of which may be better appreciated with reference to the following description and drawings.

BRIEF DESCRIPTION OF THE DRAWINGS

FIG. 1 is a schematic perspective view of two components being scanned with a 3-D grid scanner in accordance with at least one embodiment of an optical coordinate measurement system (OCMS) of the present disclosure.

FIG. 2 is an enlarged schematic view of a portion of the view of FIG. 1.

FIG. 4A is a highly magnified inset view of a surface taken from FIG. 4.

FIG. 4B is a highly magnified inset view of an alternate surface taken from FIG. 4.

Figure 3:
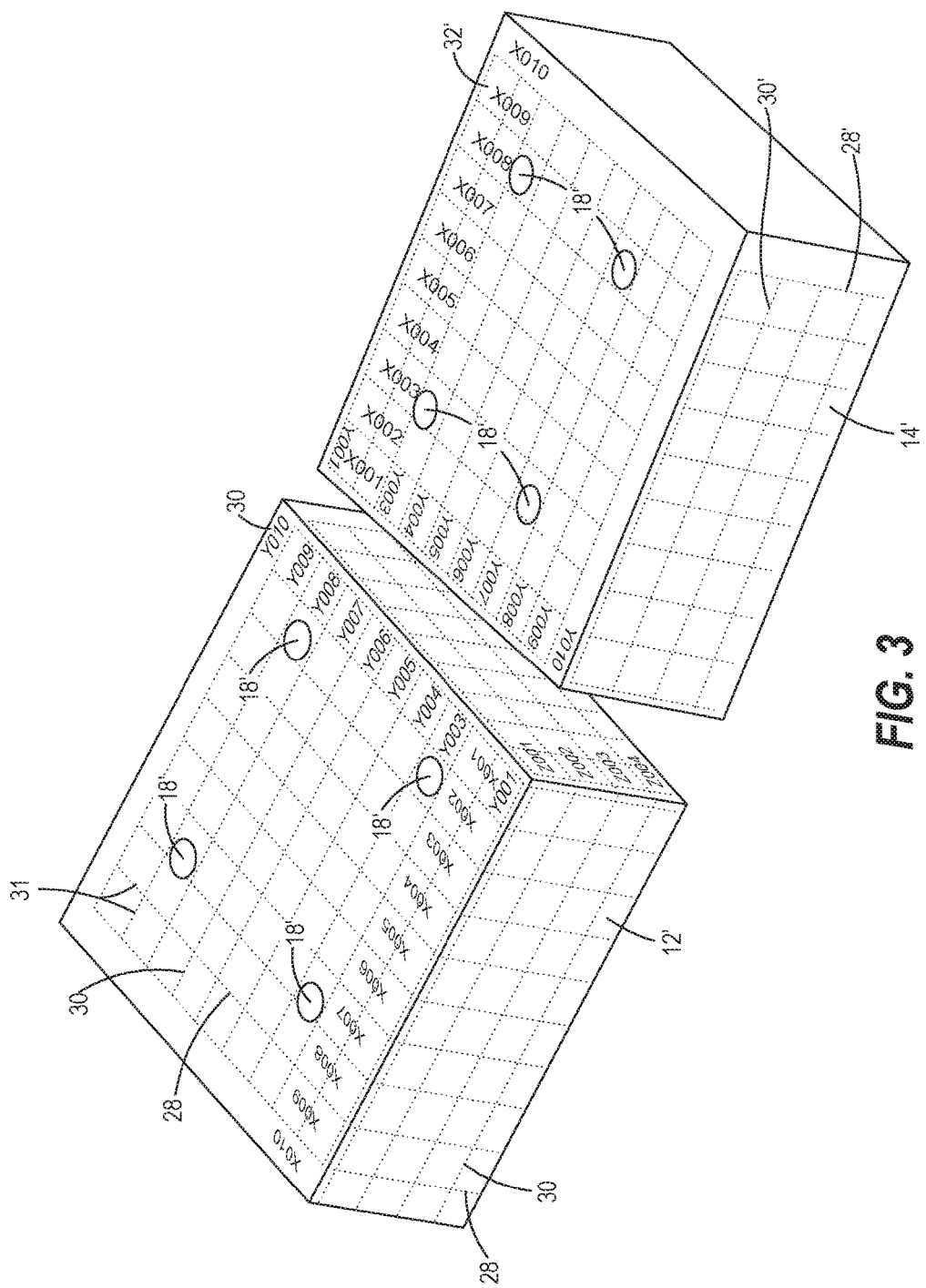
FIG. 3 is an alternate embodiment of 3-D optical reticle image arrays, integrally embedded on predetermined surfaces of the two components, in accordance with the present disclosure.

It should be understood that referenced drawings are not necessarily to scale, and that disclosed embodiments are illustrated only schematically. Aspects of the disclosed embodiments may be combined with or substituted by one another, and within various systems and environments that are neither shown nor described herein. As such, it should be understood that the following detailed description is merely exemplary, and not intended to be limiting in either application or use.

DETAILED DESCRIPTION

The following detailed description addresses both apparatus and methods for carrying out the disclosure. Actual scope of the disclosure is as defined in appended claims.

Referring initially to FIG. 1, an optical coordinate measuring system (OCMS) 10 includes a mechanism for measuring and splicing together a pair of components, i.e. a first component 12 and a second component 14 having surfaces 16 and holes 18 as shown. The holes 18 will be part of geometric target features to be identified and measured, as further explained herein. The OCMS 10 includes a 3-D scanner 20, which may be a handheld optical laser scanner of a type including a built-in inertial navigation system 21, as later described.

Alternatively, rather than being handheld, the scanner may be of a type supported on an articulating arm, such as a ROMER arm, for example. The handheld 3-D scanner 20, as shown, is a stereo camera-styled scanner, having a pair of spaced lenses 22, 24 configured to acquire real-time data from a plurality of poses, utilizing a grid style coordinate system to generate and transfer 3-D images to a point cloud. More specifically, the 3-D hand scanner 20 measures its target object, components 12 and 14, and records, as a function of pose (i.e. positional orientation and time), sending and/or otherwise capturing image data to the point cloud from which may be generated a computer aided design (CAD) model of the components 12 and 14, as those skilled in the art will appreciate. The laser scanner 20 is configured to acquire data in reference to orthogonal or bi-directional laser grid lines 26, as shown. FIG. 2 provides an enlarged view of the gridlines 26 juxtaposed against the components 12, 14 during an acquisition of data in one phase of operation of the OCMS 10.

The inertial navigation system 21 contained within the handheld laser scanner 20 provides a fixed point of reference, relative to an X-Y-Z set of common coordinates 33 (FIG. 1) on which each scanned pose are based, irrespective of operator positioning of the physical scanner device. Thus, the angle and timing of each pose, i.e. orientation of the scanner 20 in space and time relative to the target, is assured via the inertial navigation system 21 to have a common frame of reference. As such, those skilled in the art will appreciate that the OCMS 10 is not limited to utilization with relationally fixed scanning systems, such as those utilized on articulated arms.

Referring now to FIG. 3, a second embodiment of the components 12', 14' include alpha-numeric reference characters 32' for making visual identification of rows of linear patterns that form a 3-D optical reticle image array 31 on surfaces 16 of each component 12, 14. Specifically, a first set of linearly oriented rows 28 of reticle images intersect orthogonally with a second set of linearly oriented rows 30 of reticle images. Collectively, the reticle image rows 28 and 30 form the optical reticle image array 31, consisting of bi-directional rows. The reticle image rows 28, 30 may be formed and/or embedded within surfaces 16 of the components 12, 14 during their manufacture, as for example by a dot peening process. Alternatively, post-manufacture, a laser etching process may be used to create the reticle image rows 28, 30. On the other hand, the alpha-numeric reference characters 32' are not three-dimensional, and may conveniently be stenciled, printed, or otherwise conventionally applied to metal and/or composite surfaces 16.

Figure 4:
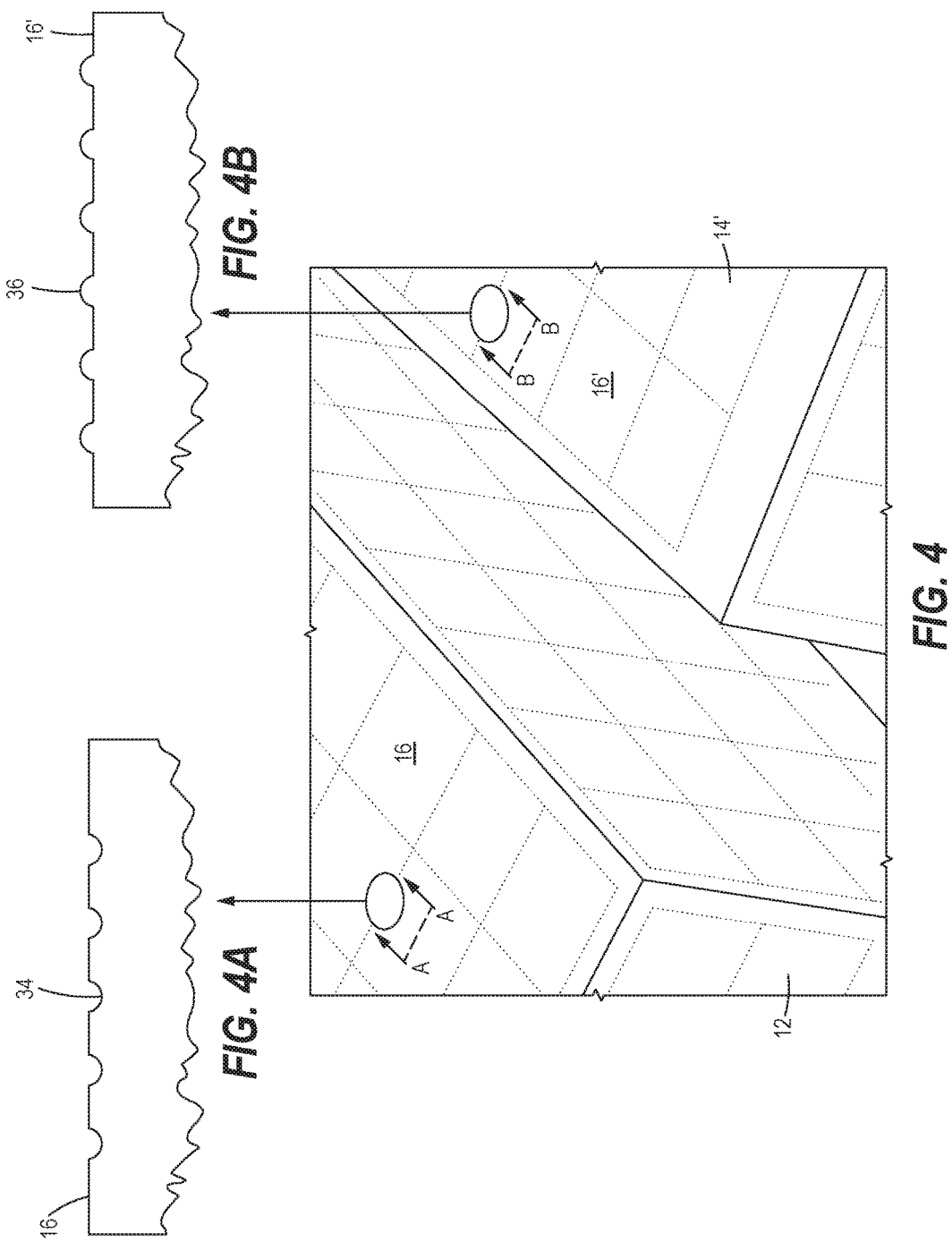
FIG. 4 is an enlarged view of select portions of FIGS. 2 and 3.

Referring now to FIG. 4, a pair of components 12 and 14' are shown enlarged, each respectively taken from first and second embodiments of FIGS. 2 and 3. Although shown paired together in the view of FIG. 4, the alternate embodiment components are paired herein only for convenience of comparison. Insets are taken from FIG. 4 from the respective components 12 and 14', with FIG. 4A taken from section A-A of the component 12, and FIG. 4B taken from section B-B of the component 14'. The surface 16 of FIG. 4A depicts three-dimensional orthogonally oriented rows 28, 30 (as in FIG. 3) of linear arrays of symmetrically formed concave divots or dimples 34 on a surface 16 of the component 12. Conversely, the surface 16' of the component 14'of FIG. 4B depicts three-dimensional rows 28', 30' of linear arrays of symmetrically formed convex protuberances or bumps 36. It should be appreciated that FIGS. 4A and 4B depict only two of a variety of three-dimensional configurations of dimples and/or bumps that may be formed in components arranged to be measured and spliced together. Moreover, the three-dimensional configurations are not contemplated to be spaced evenly apart as they appear in the schematic views presented, but will have variable spacing along each linear row 28, 30. For example, a random generation of spacing may provide a type of DNA profile for any given target area scanned on a component.

Accuracy of point cloud-achieved data may be enhanced via use of the three-dimensional optical reticle image arrays 31, which consists of unique repeating sequences of patterns. Such three-dimensional patterns may be more discernible by recognition algorithms under a variety of lighting conditions than printed or stenciled arrays, which are more likely to be distorted by indirect lighting and/or reflection. Moreover, dimples and or bumps may be readily distinguished from their surrounding surfaces by measuring depth of the three-dimensional structures, and comparing same to the surrounding surfaces.

Figure 5:
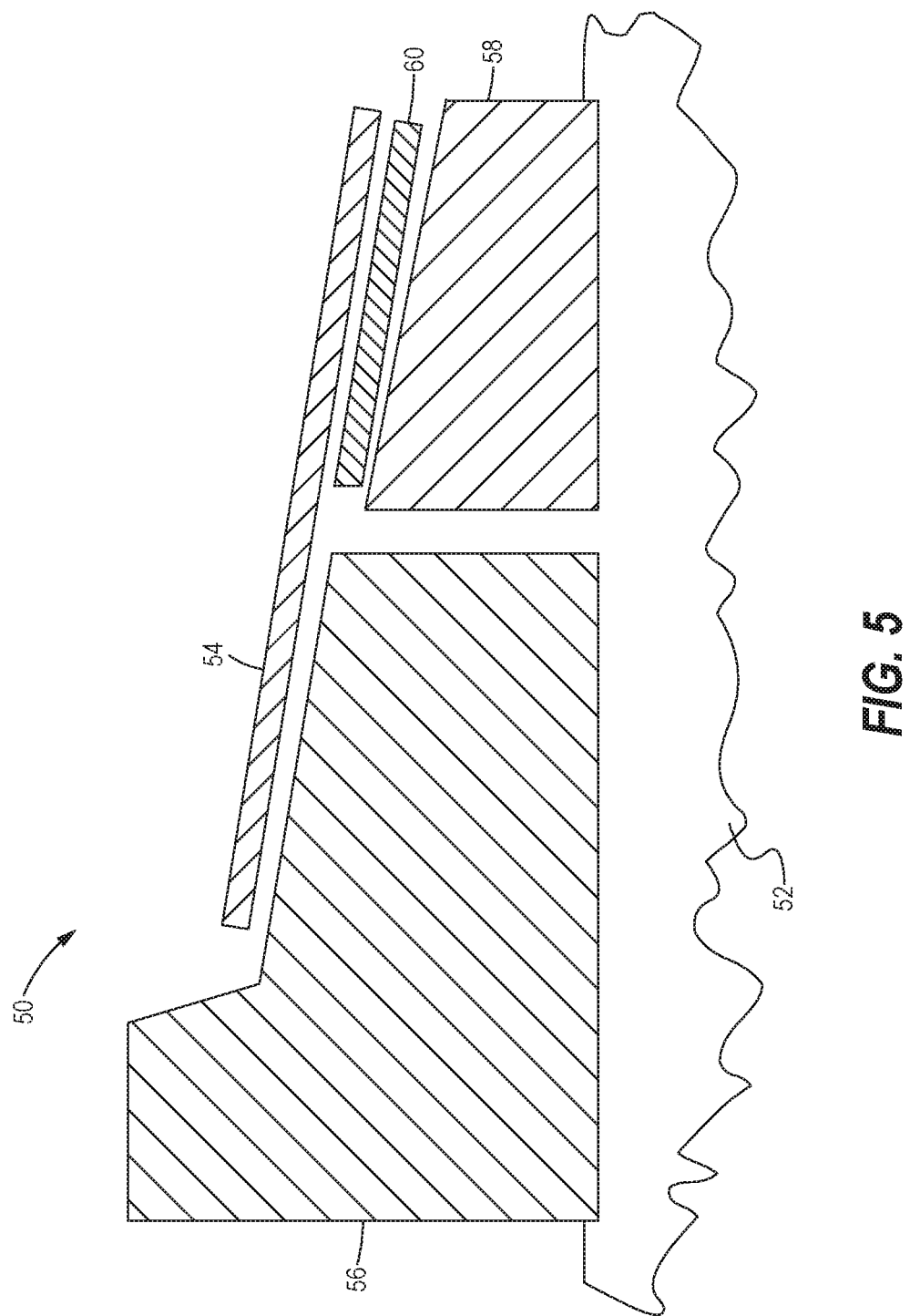
FIG. 5 is a schematic cross-sectional view of several aircraft wing components that include a splice configured to connect the components together, in accordance with the present disclosure.

FIG. 5 shows several components of an aircraft wing box assembly 50, supported on a fuselage pressure deck 52. As shown, a mating splice 54 has been applied to secure together a wing stub beam 56 and a wing transverse beam 58, with a shim 60 having been applied to properly locate the splice 54. To the extent that the OSCM 10 may be utilized for precision placements of the components together, specific physical applications and/or processes of the OSCM to measure and splice may now be described.

In at least one approach, a process of joining a pair of aircraft components together, the aircraft components having build variations that require splices for accurate system integration of the aircraft components, includes manufacturing the aircraft components to include integral three dimensional optical reticle image arrays on predetermined surfaces of the aircraft components, such that those surfaces of the aircraft components can be captured in three dimensional composite measurements transformed into a common frame of reference with the plurality of scanned poses. An optical coordinate measuring system (OCMS) can be applied so that each individual pose comprises a single field of view, and the plurality of poses may then be collated or merged together to form composite measurements that extend out-of-range of any single pose. Combined with 3-D reticle arrays 31, significant advantages of the described application of OCMS 10 may be achieved over current state-of-the-art scan protocols, particularly as applied to aerospace product manufacturing.

For each of the mating surfaces of the stub beam 56 and transverse beam 58 in the exemplary structure in FIG. 5, a flatness profile tolerance may fall within a range that includes 0.010 inches, for example. As such, physical alignment of the stub and transverse beam components may compromise overall tolerance requirements for the mating splice 54. To compensate for such event, the optical coordinate measuring system (OCMS) 10 may constrain all measured mating surface values to lie within or between a respective derived datum mating surface plane and a nominal mating surface of the measured as-built part. In any event, surface measurements shall include at least one measurement at each fastener location (e.g., location of holes 18 in stub beam 56 and transverse beam 58) across the entire mating surface.

The OCMS 10 identifies and measures locations for drilling of holes 18 (not shown in FIG. 3) in the stub beam 56 and transverse beam 58, and determines a mating surface plane for the upper splice 54 representing the alignment of mating components. After determining the mating surface plane for the upper splice 54, the OCMS 10 may identify mating surfaces for stub beam 56 and transverse beam 58, for potential shimming and/or spacing for the upper splice 54 to stub beam 26 and transverse beam 28 (e.g., identify the spacing between the determined mating surface plane for the upper splice 54 and the mating surface of transverse beam 58). Once the potential shim or spacer surfaces have been measured and designated, the geometry for the shim may be determined for machining a shim or spacer to fit the space between the splice 54 and the transverse beam depicted in FIG. 5.

Figure 6:
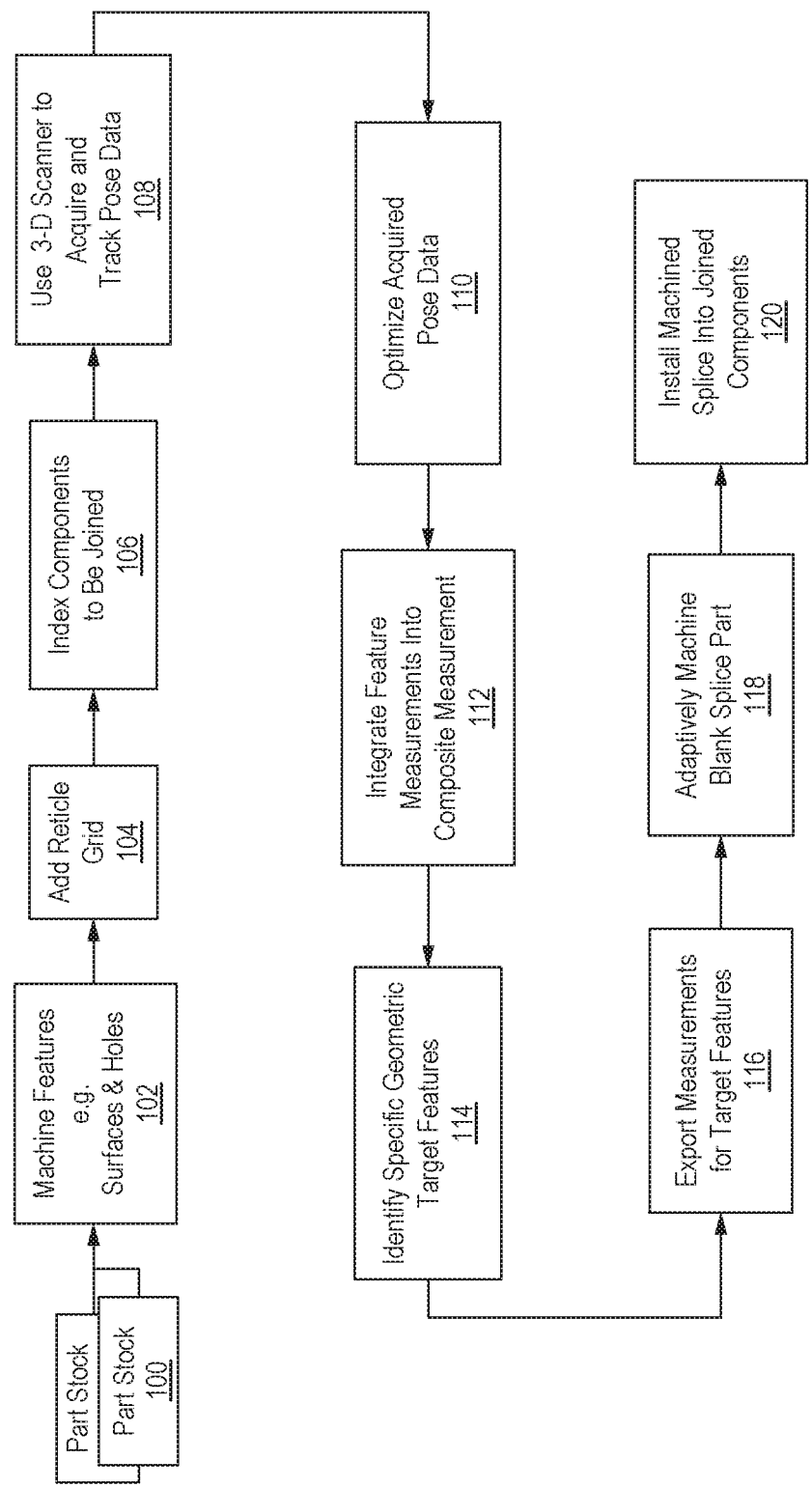
FIG. 6 is a flow diagram demonstrating one exemplary execution of the present disclosure.

Referring now to FIG. 6, the disclosed OCMS may be associated with a manufacturing sequence of building an aircraft by securing components without necessity of conventional on-board drilling of the components, particularly on heavy structural metal wing box joints formed at either side of the fuselage for attaching the left and right wings. For example, such a sequence may involve sequential steps of:
a) forming a pair of structural aircraft components, such as components 12, 14, to be joined together by first machining features into a pair of part stock, per blocks 100, 102;
b) forming a 3-D reticle grid 31 on machined features of the components to be assembled, per block 104;
c) indexing the paired components, e.g. 12, 14, on a pre-assembly jig in advance of their permanent connection to each other, per block 106;
d) acquiring an inertial 3-D scanner 20 and performing 3-D scanned poses of the machined features 18, 18' of the paired components, per block 108;
e) refining acquired pose data by applying post scan pose optimization via predetermined algorithm, per block 110;
f) integrating measurements of the machined features into an optimized composite measurement, per block 112;
g) identifying specific geometric target features from the optimized composite measurement, per block 114;
h) exporting and/or capturing measurements of the machined features, per block 116;
i) machining a blank splice part to fit the optimized composite measurement, per block 118; and
j) installing the machined splice onto the joined components to permanently connect the components together, per block 120.

With respect to the "geometric target features" noted in block 114, the above-referenced holes 18, 18' are examples of such specific geometric target features that may be utilized in measuring and splicing operations under the described OCMS 10.

The disclosed optical coordinate measuring system 10 may have other variations neither described nor suggested herein. For example, another method of forming divots or bumps (i.e., the structures comprising the 3-D optical reticle image array 31) even after the component has been manufactured might be to perforate the reticle image array into a pre-cured strip of fiberglass or composite and then bond same to the component.

Although described in terms of specific structures and components, other configurations and/or other components may be utilized, potentially in other environments. Moreover, although the disclosure presents structures in only shapes and sizes depicted, numerous variations of disclosed structures may be envisioned for use in alternative embodiments, as may be appreciated by those skilled in the art.

What is claimed is:

1. An optical coordinate measuring system (OCMS) for components having build variations that require splices for accurate system integration of the components; the OCMS comprising:
   manufacturing the components to include integral three dimensional optical reticle image arrays on predetermined surfaces of the components, such that those surfaces of the components can be captured by a 3-D optically scanned composite measurement associated with a plurality of poses, each pose comprising orthogonal grid lines; and
   wherein each individual pose comprises a single field of view, and the plurality of poses are then collated to form composite measurements that extend out-of-range of any single pose.

2. The OCMS of claim 1, wherein the integral three dimensional optical reticle image arrays are formed of concave dimples in surfaces of the components.

3. The OCMS of claim 1, wherein the integral three dimensional optical reticle image arrays are formed of convex bumps on surfaces of the components.

4. The OCMS of claim 1, wherein the integral three dimensional optical reticle image arrays are bi-directional.

5. The OCMS of claim 1, wherein the three dimensional composite measurement is optically acquired by a 3-D scanner.

6. The OCMS of claim 1, wherein the three dimensional composite measurement is acquired by a portable hand-held 3-D scanner.

7. The OCMS of claim 6, wherein the portable hand-held 3-D scanner includes an inertial navigation system.

8. The OCMS of claim 7, wherein the 3-D scanner acquires a plurality of poses, and wherein the poses are collated together with respect to a common frame of reference.

9. The OCMS of claim 8, wherein measurements obtained from the scanned poses are transformed into the common frame of reference.

10. The OCMS of claim 1, wherein the three dimensional optical reticle image arrays are formed by dot peening of the components.

11. The OCMS of claim 1, wherein a plurality of scanned poses define a composite measurement, and an orthogonal pair of grid lines exist in each pose.

12. A process for joining a pair of aircraft components together, the aircraft components having build variations that require splices for accurate system integration of the aircraft components; the process including:
   manufacturing the aircraft components to include integral three dimensional optical reticle image arrays on predetermined surfaces of the aircraft components, such that those surfaces of the aircraft components are captured by a three dimensional scanned composite measurement associated with a plurality of poses, each pose comprising an orthogonal pair of grid lines;
   applying an optical coordinate measuring system (OCMS) so that each individual pose comprises a single field of view, and the plurality of poses are then collated to form composite measurements that extend out-of-range of any single pose.

13. The process of claim 12, wherein the integral three dimensional optical reticle image arrays are orthogonal.

14. The process of claim 12, wherein the three dimensional composite measurement is optically acquired by a 3-D scanner.

15. The process of claim 12, wherein the three dimensional composite measurement is acquired by a portable hand-held 3-D scanner.

16. The process of claim 15, wherein the portable hand-held 3-D scanner includes an inertial navigation system.

17. The process of claim 12, wherein the integral three dimensional optical reticle image arrays are formed of concave dimples in surfaces of the components.

18. The process of claim 17, wherein the three dimensional optical reticle image arrays are formed by dot peening of the components.

19. The process of claim 12, wherein the integral three-dimensional optical reticle image arrays are formed of convex bumps on surfaces of the components.

20. A process of measuring and splicing together a pair of components; the process comprising:
  a) forming a pair of components to be joined together by first machining features into a pair of part stock;
  b) forming a 3-D reticle grid on machined features of the components;
  c) positioning and indexing the paired components on a pre-assembly jig in advance of their permanent connection to each other;
  d) acquiring an inertial 3-D scanner and performing 3-D scanned poses of the machined features;
  e) Optimizing acquired scanned data;
  f) integrating measurements of the machined features into an optimized composite measurement;
  g) identifying machined features from the optimized composite measurement;
  h) capturing measurements of the machined features;
  i) machining a blank splice to fit the optimized composite measurement; and
  j) installing the machined splice onto the components to permanently connect the components together.

* * * * *